Oct. 22, 1935. C. I. McNEIL Re. 19,738

CONTROLLING GENERATOR

Original Filed Jan. 16, 1929

INVENTOR.
Charles I. Mc Neil
BY Martin J. Finnegan
ATTORNEY.

Reissued Oct. 22, 1935

Re. 19,738

UNITED STATES PATENT OFFICE 19,738

CONTROLLING GENERATOR

Charles I. McNeil, Bloomfield, N. J., assignor to Eclipse Machine Company, Elmira Heights, N. Y., a corporation of New York Original No. 1,896,142, dated February 7, 1933, Serial No. 332,998, January 16, 1929. Application for reissue February 27, 1934, Serial No. 713,213

5 Claims. (Cl. 171—229)

Figure 1:
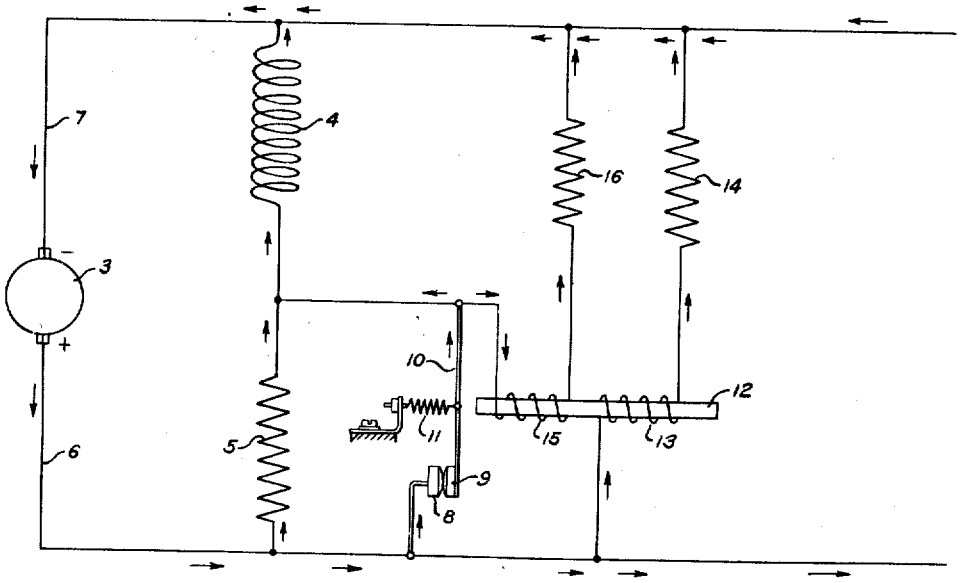

This invention relates to controlling or regulating the output of an electric current generator.

It has heretofore been proposed to employ a regulator of the vibrating reed or armature type for controlling the output, such as the voltage output, of a generator. Regulators of this type embody a pair of contacts which are opened and closed by an electro-magnet for purposes well understood in the art, the opening and closing movements of the contacts being usually of the order of 10 to 40 cycles per second. When regulators of the type are employed for controlling the voltage output of a generator used in radio transmitting apparatus of the continuous wave type, the action of the contacts results in an intermittent note in the receiver so similar in pitch to that of the other sounds in the transmitted waves as to render impossible, in many instances, the satisfactory reception of signals. Accordingly, one of the objects is to provide a novel method for regulating the voltage output of a generator, the use of which serves to overcome the above objectionable effect.

Another object of the invention is to provide a voltage regulating method applicable to control a pair of coacting contacts for intermittently interrupting an electric circuit, in such a way as to render the action of said contacts of relatively high frequency, such, for example, as 80 to 300 or more cycles per second.

A further object of the invention is to provide in a regulator embodying a multi-coil electro-magnet, a novel method of forming and combining the various coils so as to insure proper regulation, regardless of changes in speed of and load on the generator.

These and other objects and advantages to be derived from the use of the invention herein disclosed involve the inter-relation and relative functions of the parts and will become apparent upon an inspection of the following specification and the accompanying drawing, wherein two embodiments of the invention are illustrated; but it is to be expressly understood that the drawing is for the purpose of illustration only and is not designed as a definition of the limits of the invention, reference being had for this purpose to the appended claims.

Figure 2:
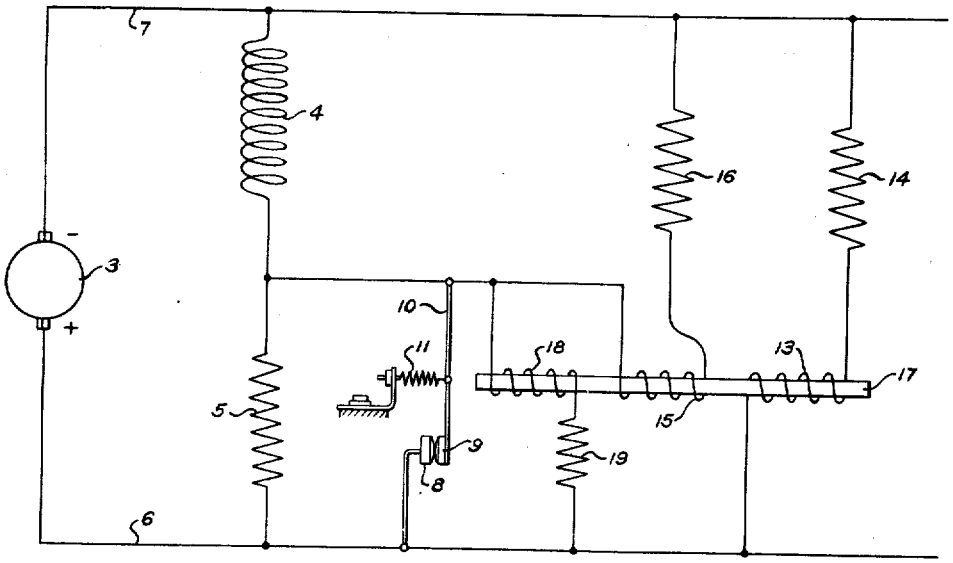

In the drawing,

Fig. 1 is a diagrammatic view illustrating one form of regulating apparatus embodying the present invention; and Fig. 2 is a diagrammatic view of another embodiment of the invention.

Referring more particularly to Fig. 1, the armature of the generator to be regulated is indicated at 3, the field winding at 4, and the field resistance at 5, said winding and resistance being connected in series across the positive main 6 and the negative main 7.

The novel regulating method may be applied to a pair of contacts 8 and 9 which are normally closed and are shunted around the resistance 5. Contact 5 is mounted on a vibrating armature 10 which is pivotally mounted in any suitable manner, and adjustable resilient means, such as a coil spring 11 is operatively connected to said armature to normally maintain contact 9 in engagement with contact 8.

An electro-magnet having a core 12, which is preferably laminated, is associated with armature 10, and spring 11 is so adjusted that when the voltage of the generator rises above a predetermined value, the electro-magnet is effective to overcome the tension of said spring and move contact 9 out of engagement with contact 8, whereupon the field resistance 5 is placed in circuit with the field 4. The resistance of the field circuit is now of such value as to prevent the desired amount of field current from flowing, whereupon a reduction in the generator voltage is produced. This dropping of the voltage weakens the magnetic field of the electro-magnet to such an extent that the contacts 8 and 9 are closed by spring 11 to short circuit resistance 5, whereupon the field flux and armature voltage are again built up.

The core 12 of the electro-magnet carries a winding 13 which is in series with a resistance 14, the winding and resistance being connected across the mains 6 and 7 as shown. The magnetic field set up by parallel coil 13 rises or falls relatively slowly, since it varies in accordance with the changes in the voltage in the armature. The latter in turn follows the changes of current in the field. Accordingly, in regulators embodying only a coil such as is indicated at 13, the opening and closing movements of contacts 8 and 9 are relatively slow, i. e., they are of the order of 10 to 40 cycles per second.

A method is provided for speeding up the action of the contacts, whereby the movement of the same is of a high frequency, as, for example, 80 to 300 or more cycles per second. For this purpose the core 12 carries a second winding 15 which is connected in series with a resistance 16, said winding and resistance being shunted around generator field 4 and in series with contacts 8 and 9. Coil 15 is wound in such a manner as to strengthen the magnetic field set up in core 12 by the coil 13, and the tension of spring 11 is overcome only when both coils coact to produce the desired strength of field.

When the contacts are closed, current flows from the positive main 6 through said contacts, series coil 15, and resistance 16, and said series coil coacts with parallel coil 13 to set up the magnetic field in core 12. When the voltage output of the generator exceeds a predetermined amount as determined by the setting of spring 11, the magnetic field of the electro-magnet is sufficiently strong, due to the combined action of coils 13 and 15, to overcome the tension of spring 11 and move contact 9 out of engagement with contact 8. The instant the contacts open, the current in series coil 15 falls, thus producing a sudden drop in the flux of the core 12 and this drop is independent of the fall of the voltage in the armature 3. Armature 10 instantly moves to re-engage contact 9 with contact 8, due to the action of spring 11. A much quicker action of the contacts is thus obtained than results from the use of a single coil such as parallel coil 13 since the magnetic field produced by the latter falls relatively slowly in accordance with the drop of voltage in the armature.

The use of series coil 15 in combination with parallel coil 13 is sufficient to raise the frequency of the contacts to as high as 80 to 300 cycles or more per second. This change in the frequency of the contacts may not entirely eliminate the intermittent note resulting from the engagement and disengagement of the contacts, but the note will be of a much higher pitch than that of other sounds resulting from the intermittent waves and hence will not interfere with the reception of signals. In other words, the regulator preferably employed in practicing the present invention is so constructed as to eliminate or minimize the interference or noises in radio signals emitted by a transmitter energized by a voltage regulated generator.

The resistance units 14 and 16 may be employed as indicated in order to permit the use of a larger current flow in coils 13 and 15 without danger of overheating the coils as might result from winding the resistance directly on core 12. The larger portion of the heat is generated in the resistance and by placing said resistance at a distance from the coil, a greater flow of current may be used for a predetermined coil temperature. Since the circuit 15, 16 is of small inductance, it acts to absorb a portion of the voltage set up in field 4 by the sudden changes in field current.

It is highly desirable that the regulator maintain the voltage constant within very narrow limits. Since the current in series coil 15 varies in proportion to the field current, which latter in turn varies with the speed of and the load on the generator, a change in the current flowing through said coil results in a slight change in the setting of the regulator.

Conversely, on decrease in the effective value of the field current (such as results from an increase in generator speed or a decrease in load) the voltage impressed upon coil 15 decreases, thereby weakening the magnetic pull. To offset this decrease in pull, coil 13 must be strengthened by increase in voltage from the generator in order to effect opening of contacts 8 and 9. There is thus a tendency for the generator voltage to rise with increase in speed or removal of load. This tendency may be overcome or at least compensated for, by the use of the arrangement shown in Fig. 2, now to be described.

In Fig. 2 there is illustrated another embodiment of the present invention wherein a change in the current flowing through coil 15 is ineffective to vary the regulator setting. For this purpose the core 17 of the electro-magnet carries a third coil 18 in series with a resistance 19, said coil and resistance being in parallel with contacts 8 and 9, and also in series with coil 15.

When the contacts are open, the current flowing through coil 18 is relatively high and the current flowing through coil 15 is relatively low, and the field set up by coil 18 is acting in a direction opposite to that set up in coil 15. When the contacts are closed, substantially no current flows through coil 18 while a relative large amount of current flows through coil 15, and, as pointed out above in connection with Fig. 1, the coils 15 and 13 coact together to set up the desired magnetic field for opening contacts 8 and 9.

As the voltage tends to rise above the desired amount, a point is reached where the field set up by coils 13 and 15 is effective to overcome the tension of spring 11 and open contacts 8 and 9. Immediately the field of coil 15 drops due to the decrease in current now flowing through the coil while a relatively large amount of current flows through coil 18, and the field of the latter is effective to diminish or nullify the effect of the field in coils 13 and 15. In other words, the magnetic field for holding the contacts open is very quickly destroyed and spring 11 is now effective without any delay to again close the contacts. Hence, the speed of the regulator is increased by the use of coil 18.

This increase is further accelerated as the speed of the generator increases, because the current in coil 18 varies as the voltage across the contacts 8 and 9, which in turn varies inversely with the speed of the generator. Hence, at high speeds, (or upon removal of load) demagnetizing force of coil 18 is increased thereby causing contacts to close sooner than at low speeds, or at relatively high loads.

From the foregoing it is apparent that the addition of the coil 18 serves to increase the speed of contact operation and compensate for any tendency in the system toward a variation in voltage across the lines 6 and 7, the ultimate result being an improvement in the quality of regulation.

There is thus provided a novel method for controlling the voltage regulator which is readily adaptable to radio transmitting apparatus for maintaining constant voltage. It is to be expressly understood however, that the said method is not limited in its use to the radio field, as will now be readily apparent to those skilled in the art, and reference will therefore be had to the appended claims for a definition of the limits of the invention.

What is claimed is:

1. In combination with a generator having a field winding and a field resistance, means for regulating the voltage output of said generator by intermittently placing said resistance in circuit with said field winding including a pair of coacting contacts, and means including an electro-magnet for controlling the engagement of said contacts, the electro-magnet embodying a coil in series with said contacts and in parallel with said winding and another coil in parallel with said contacts.

2. In a regulator of the type embodying a pair of coacting contacts, a pivoted armature carrying one of said contacts, yielding means for maintaining said contacts closed, and an electro-magnet for opening said contacts, the electro-magnet including a core and a plurality of coils wound thereon, one of the latter being in series with said contacts and another of the same being in parallel with the contacts but in series with the first named coil, and a third coil in parallel with said contacts and the other two coils.

3. In a regulator of the type having a vibrating armature, an electro-magnet comprising a core, a coil on said core having a series relationship with said armature and a second coil on said core, the series coil being adapted to coact with said second coil to set up a predetermined field in said core and a third coil associated with said first and second coils to compensate for changes in the field induced by said third coil.

4. In a regulator of the vibrating armature type, an electro-magnet comprising a core, and a plurality of coils wound thereon, the first and second of said coils being adapted to coact one with the other to set up a predetermined field in said core, and a third coil adapted to coact with said first and second coils, to compensate for the changes in the magnetic field resulting from said third coil.

5. In a vibrating switch type of regulator for controlling the output of an electrical circuit, the method of obtaining a high frequency vibrating action which comprises subjecting said switch to an opening magneto-motive force bearing a definite relation to the voltage across the output terminals of said circuits, applying a closing force of a constant strength intermediate the maximum and minimum opening force and suddenly varying said magneto-motive force by an amount unrelated to said output voltage, immediately following each opening and closing movement of the switch, and interposing in the magnetic field of the switch a de-magnetizing factor to compensate for the changes in the frequency of vibration resulting from an increase in generator speed, or a decrease in load.

CHARLES I. McNEIL.